US008494225B2

(12) United States Patent
Center

(10) Patent No.: US 8,494,225 B2
(45) Date of Patent: Jul. 23, 2013

(54) NAVIGATION METHOD AND APARATUS

(76) Inventor: Julian L. Center, Andover, MA (US)

( * ) Notice: Subject to any disclaimer, the term of this patent is extended or adjusted under 35 U.S.C. 154(b) by 47 days.

(21) Appl. No.: 13/030,721

(22) Filed: Feb. 18, 2011

(65) Prior Publication Data

US 2011/0206236 A1 Aug. 25, 2011

Related U.S. Application Data

(60) Provisional application No. 61/338,416, filed on Feb. 19, 2010.

(51) Int. Cl.
*G06K 9/00* (2006.01)
*H04N 7/00* (2006.01)
*G01C 21/10* (2006.01)

(52) U.S. Cl.
USPC ............................ 382/107; 348/113; 701/500

(58) Field of Classification Search
USPC .................. 382/103, 107; 348/113, 154, 155, 348/169, 170, 171, 172, 208.16, 407.1; 715/737, 715/738, 850, 851, 845, 854; 701/400, 460, 701/500
See application file for complete search history.

(56) References Cited

U.S. PATENT DOCUMENTS

| | | | |
|---|---|---|---|
| 8,320,615 B2* | 11/2012 | Hamza et al. | 382/103 |
| 2008/0089556 A1* | 4/2008 | Salgian et al. | 382/103 |
| 2009/0248304 A1* | 10/2009 | Roumeliotis et al. | 701/220 |
| 2010/0266041 A1* | 10/2010 | Gish et al. | 375/240.15 |

* cited by examiner

*Primary Examiner* — Abolfazl Tabatabai
(74) *Attorney, Agent, or Firm* — Perman & Green, LLP

(57) ABSTRACT

An automated guidance system for a moving frame. The automated guidance system has an imaging system disposed on the frame; a motion sensing system coupled to the frame and configured for sensing movement of the frame; and a processor communicably connected to the vision system for receiving image data from the vision system and generating optical flow from image data of frame surrounding. The processor is communicably connected to the motion sensing system for receiving motion data of the frame from the motion sensing system. The processor is configured for determining, from kinematically aided dense optical flow correction to frame kinematic errors, due to errors in motion data from the motion sensing system.

20 Claims, 11 Drawing Sheets

NAVIGATION METHOD AND APARATUS

CROSS REFERENCE TO RELATED APPLICATIONS

This application claims priority from U.S. Provisional Patent Application Ser. No. 61/338,416 filed Feb. 19, 2010 entitled "METHOD FOR COMBINING MACHINE VISION AND INERTIAL MEASUREMENTS TO PROVIDE ACCURATE MOTION TRACKING, LOCALIZATION, AND NAVIGATION" which is hereby incorporated by reference herein in its entirety.

BACKGROUND

1. Field

The disclosed embodiments relate to a navigation method and apparatus and, more particularly, to a method and apparatus for combining machine vision and inertial measurements to provide accurate motion tracking, localization, and navigation.

2. Brief Description of Earlier Developments

A number of applications require precise motion tracking. For example, autonomous robot operation in an unconstrained environment requires that the robot keep track of its own position and attitude to be able to map the space and navigate through it. Coordination of an autonomous team of robots requires that the robots keep track of their own positions as well as the other robots' positions. Many applications use the Global Positioning System (GPS) to track the motion of vehicles. However, GPS is not available indoors or under heavy foliage. Furthermore, low-cost GPS units cannot accurately determine the attitude of the vehicle. Lunar and planetary exploration, either by humans or robots, also requires precise localization and navigation. Unless an infrastructure of beacons and/or navigation satellites has been established, these explorers must rely on self-contained navigation systems.

Several application areas require accurate tracking of a human or vehicle throughout a large space. An example is motion capture of both actors and mobile cameras for motion picture production. As a further example, on the Spirit and Opportunity Mars Exploration Rovers (MERs), Visual Odometry (VO) has been used to navigate in situations where wheel slip rendered wheel odometry useless for navigation. By monitoring wheel slip, VO played a key role in mission safety by preventing the rovers from bogging down or sliding down a slope. The MERs use a form of visual odometry based on tracking features in a sequence of stereo images. Because of limited onboard computing power, a number of approximations were required to produce an algorithm that could run in a reasonable amount of time. Even so, each complete VO cycle requires 2 to 3 seconds to complete on the MER's 20 MHz RAD6000 CPU. When VO is used for navigation, the rover drive speed must be reduced by an order of magnitude because VO requires that the sequence of images must overlap a significant amount. Therefore, the MERs use VO only when wheel odometry was expected to be inaccurate due to wheel slip. Like most so-called optical flow calculations, MER VO is really implemented by tracking a relatively small number of features. A Harris corner detector operator is applied to each stereo image pair. To reduce the computations, a grid of cells is superimposed on the left image. In each cell, the feature with the strongest corner response is selected to be tracked. Pseudo-normalized correlation is used to determine the disparity of the feature locations in the two stereo images. The 3-D locations of the features are determined by projecting rays through the two camera models. When the next stereo pair is acquired, wheel odometry and the 3-D locations of the features are used to project the features into the new stereo pair. A correlation search then establishes new 2D locations of the features in each image and new 3-D locations are computed by stereo matching. Motion estimation is done by embedding a least-squares estimation algorithm within a Random Sample Consensus (RANSAC) algorithm. This approach was mandated by the relatively long time intervals between image acquisitions. Several VO algorithms have been reported in the literature. Optical computing techniques have been used to produce an experimental device that determines optical flow at a relatively small number of locations in the image.

Other methods have been based on feature tracking. Nister, et. al. described a VO algorithm formulated to identify features by Harris corner detection, track them using normalized correlation, and determine ego motion by minimizing image reprojection error using a preemptive RANSAC algorithm. They have reported position errors of 1-2% over outdoor courses up to 365 meters. However, they did not measure attitude errors. Campbell, et. al. described a VO system using COTS hardware and software from the OpenCV library. As with the other algorithms, features were identified using the Harris corner algorithm. Then an efficient form of the Lucas-Kadane algorithm, available in the OpenCV library, was applied to compute the optical flow. The ego motion was estimated based on the assumption that the lower portion of the image was "ground" and the upper portion was "sky." The angular motion was estimated from the sky portion and the linear motion was estimated from the ground portion assuming features were predominately on the same ground plane. This worked in the examples they provided because the "sky" contained distant objects that could provide an angular reference. Konolige et. al. have developed an accurate VO algorithm using multi-scale feature tracking, bundle adjustment, and IMU integration. They quote an accuracy of 0.1% over a 9 km trajectory on a vehicle running at 5 m/s. This method differs from the Bayesian VO proposed here As described further herein. A research group at INRIA, Sophia-Antipolis, France has developed what they call a visual SLAM algorithm. As with Bayesian VO, this algorithm estimates the camera location directly from changes in intensities between images. However, the visual SLAM algorithm uses a second-order optimization procedure and does not quantify uncertainties. Recently, there has been considerable interest in combining vision and inertial systems. However, none of this research has explored a fully Bayesian approach. Accordingly, there is a need for an efficient automated means of precisely tracking location and attitude.

BRIEF DESCRIPTION OF THE DRAWINGS

The foregoing aspects and other features of the exemplary embodiments are explained in the following description, taken in connection with the accompanying drawings, wherein.

DETAILED DESCRIPTION OF THE EXEMPLARY EMBODIMENT(S)

Figure 1:
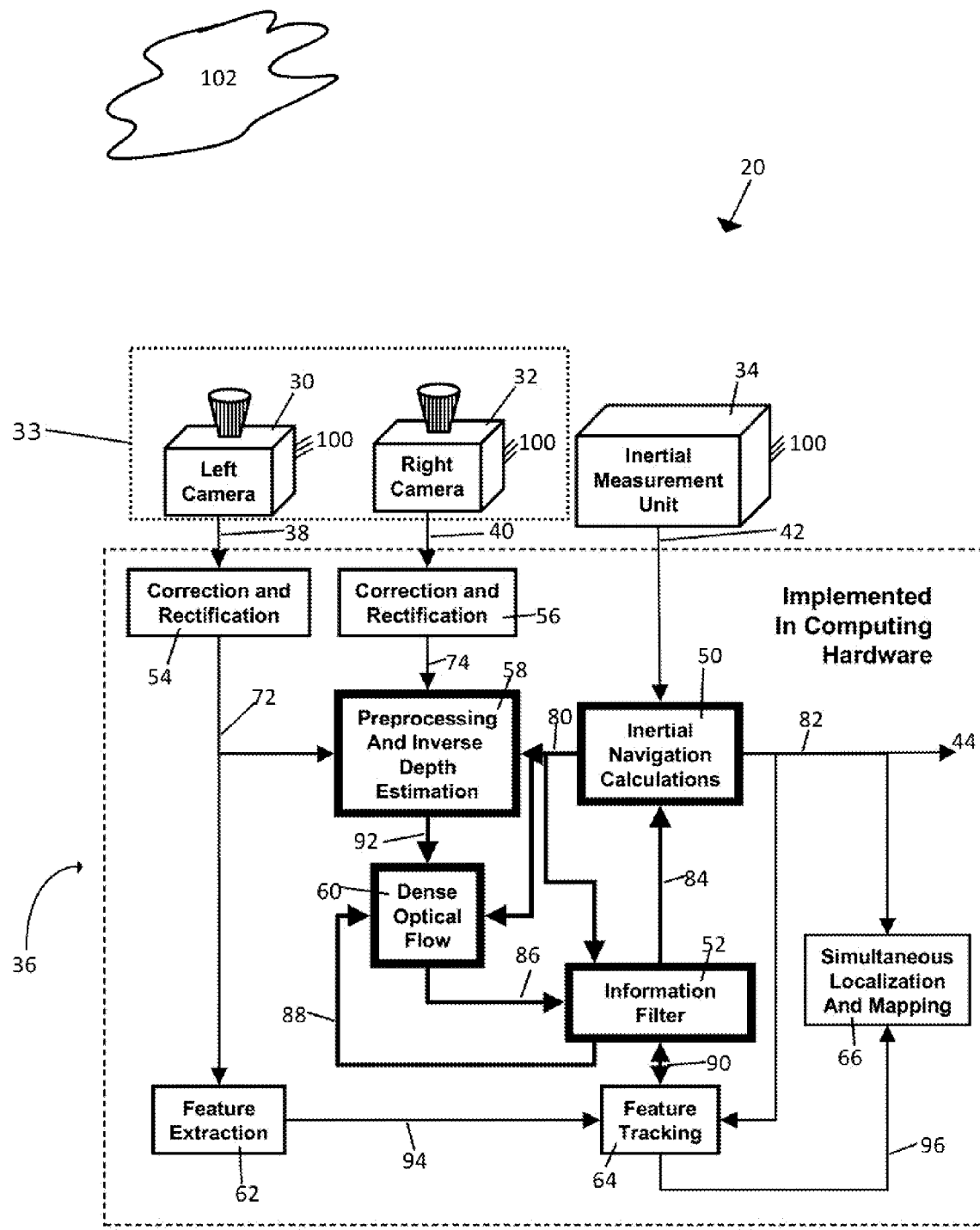
FIG. 1 is a schematic view of a navigation system for a movable frame or structure.

Referring to FIG. 1, there is shown, a schematic view of a navigation system 20 for a vehicle or moving frame, incorporating features in accordance with an exemplary embodiment. Although the present invention will be described with reference to the embodiments shown in the drawings, it should be understood that the present invention can be embodied in many alternate forms of embodiments. In addition, any suitable size, shape or type of elements or materials could be used.

FIG. 1 shows an overview of navigation system 20 and illustrates its context in an autonomous navigation system. In the embodiment shown, a method of combining machine vision and kinematic (e.g. inertial) measurements provides an automated means of precisely tracking the pose, for example, location and attitude or otherwise of the motive frame, such as a human, robot, or vehicle. This method can be implemented by real-time computation to accurately track the motion of an instrument package consisting of electronic cameras, gyros, and accelerometers. A first application of the method may be to track the motion of a surface vehicle in GPS-denied areas, such as indoors, under heavy foliage, or on an extra-terrestrial body. A second application of the method may be tracking of the changing attitude and position of a human or robot moving through an indoor space. In alternate embodiments, any suitable navigation or tracking application may be provided.

Navigation system 20 relates to motion tracking, localization, and navigation of either a vehicle, a robot, or a human and, more particularly, to methods for tracking motion, localizing, and navigating in situations where the use of satellite navigation (e.g., GPS) is either degraded or unavailable or in situations where accurate estimates of attitude are desired. Navigation system may be a self-contained module that can track motion without the aid of an infrastructure, such as navigation satellites or beacons (though in alternate embodiments signals from positioning infrastructure may be used as well). Navigation system 20 may provide a method for combining machine vision with signals from inertial sensors, such as gyros and accelerometers. In alternate embodiments signals from other kinematic sensing sensors, such as wheel odometry may be used. As will be described further below, navigation system 20 makes proper use of substantially all available information in camera images by assessing the information content of each pixel. Navigation system 20 may employ the use of dense stereo vision to estimate the inverse of the depth (distance along the optical axis) at substantially each point in the images along with the certainty, or conversely the uncertainty in each of these estimates. Navigation system 20 may employ inertially-aided or kinematically aided dense optical flow, which uses inertial or other suitable kinematic measurements to predict the change in image intensity (e.g. gray scale value) of each image point (or pixel) from frame to frame. Furthermore, navigation system 20 may use the deviation between observed intensity changes and such aforementioned predicted changes to correct inertial system errors in positioning. In contrast, some low-level optical-flow methods may produce estimates of local image velocities, that is, movements of features in the image. In other exemplary embodiments, navigation system 20 may employ a method for utilizing these local image velocities alternatively or in combination with dense flow optical methods, to produce an equivalent measurement of vehicle linear and angular velocities. In yet other exemplary embodiments, navigation system 20 may employ multiple cameras, including for example, cameras based on optical mouse sensor integrated circuits.

Navigation system 20 may provide accurate motion tracking in any number of exemplary applications and will be effective in both high and low contrast environments. Navigation system 20 may be a device that can determine the change in its position and attitude from a starting position and attitude. This device may combine information from stereo cameras and inertial sensors in a manner that takes advantage of the strengths of each device. Inertial sensors used alone may track high-speed motions accurately, but are subject to low-frequency drift errors. Conversely, imagery alone does not suffer from long-term drifts, but is unable to track high-speed motions accurately. Elements of navigation system 20 may employ algorithms, for example as described below, which combine these complementary information sources to produce highly accurate estimates of the position and attitude of the device and also to determine error based on certainties (or uncertainties in) these estimates.

FIG. 1 illustrates a typical application of navigation system 20 where navigation system 20 may be an automated guidance system or an autonomous navigation system for a moving frame 100. In the exemplary embodiment illustrated in FIG. 1, navigation system 20 is depicted in a representative configuration, having at least a pair of cameras 30, 32. The cameras shall be referred to for convenience within the description as left and right cameras 30, 32, though in alternate embodiments any suitable reference frame may be used. In alternate embodiments, there may be any suitable number and type of cameras capable of generating image field and depth information that may be a machine vision system 33 suitably coupled to frame 100. An inertial measurement unit or system 34 may be suitably coupled to frame 100 and processing platform 36 where data and/or signals 38, 40, 42 from left and right cameras 30, 32 and inertial measurement unit 34 are processed with processing platform or processor 36 which outputs tracking and navigation data 44. In the embodiment shown, imaging system 30, 32 is shown disposed on frame 100 with motion sensing system 34 also coupled to frame 100 and configured for sensing movement of the frame as will be described. Processor 36 is shown communicably connected to vision system 30, 32 for receiving image data from vision system 30, 32 and generating optical flow 38, 40 from image data of frame surrounding 102. As may be realized, the processor, may be resident on the frame, or may be, at least in part, located remotely and communicably coupled to the sensors via a suitable communication system. Processor 36 is further shown communicably connected to motion sensing system 34 for receiving motion data 42 of frame 100 from motion sensing system 34. As will be described, processor 36 is configured for determining, from kinematically aided dense optical flow, correction to frame kinematic errors, due to errors in motion data from the motion sensing system. As will be described, processor 36 is configured to determine a predicted change in intensity of each image pixel from inertial measurement data 42, and processor 36 is configured to use a deviation of an observed intensity change of each image pixel from the predicted change in intensity of each image pixel to correct an inertial system error. Although processing platform 36 may employ features as shown, the features are exemplary where more or less features may be provided or where the features may be provided, for example, as part of left and right cameras 30, 32, inertial measurement unit 34 or any other suitable module. In the embodiment shown, inertial measurement unit (IMU) 34 and two electronic cameras 30, 32 are shown as may be rigidly bonded together and to frame 100. Although cameras 30, 32 are shown as left and right cameras, in alternate embodiments, other configurations, for example, top and bottom cameras may be used. Further, more than two or multiple cameras or cameras based on optical mouse sensors may be used. Where multiple cameras are used, the output quality of each may be measured and weighted and one or more selected for further processing and use.

Figure 2:
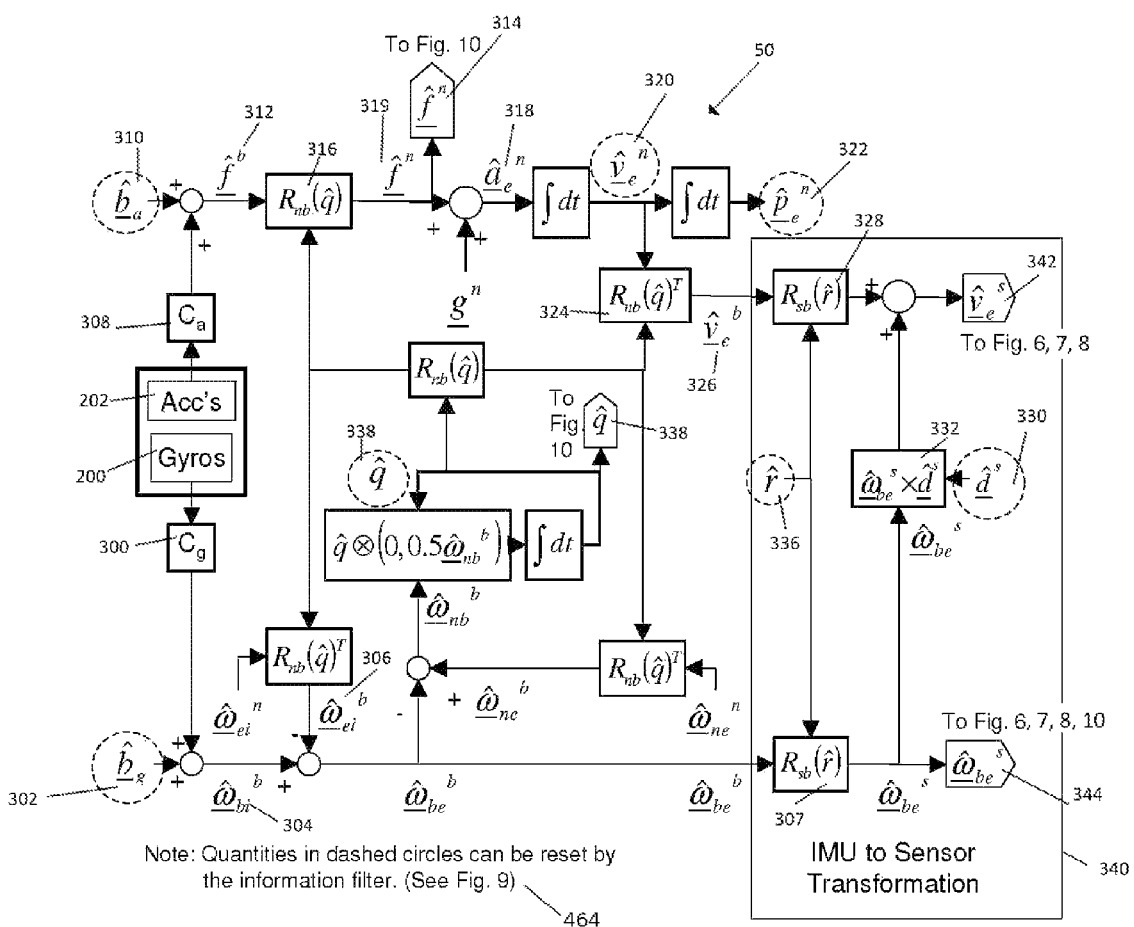
FIG. 2 is a block diagram of signal flow for incorporating features in accordance with navigation determination of the navigation system.
Figure 4:
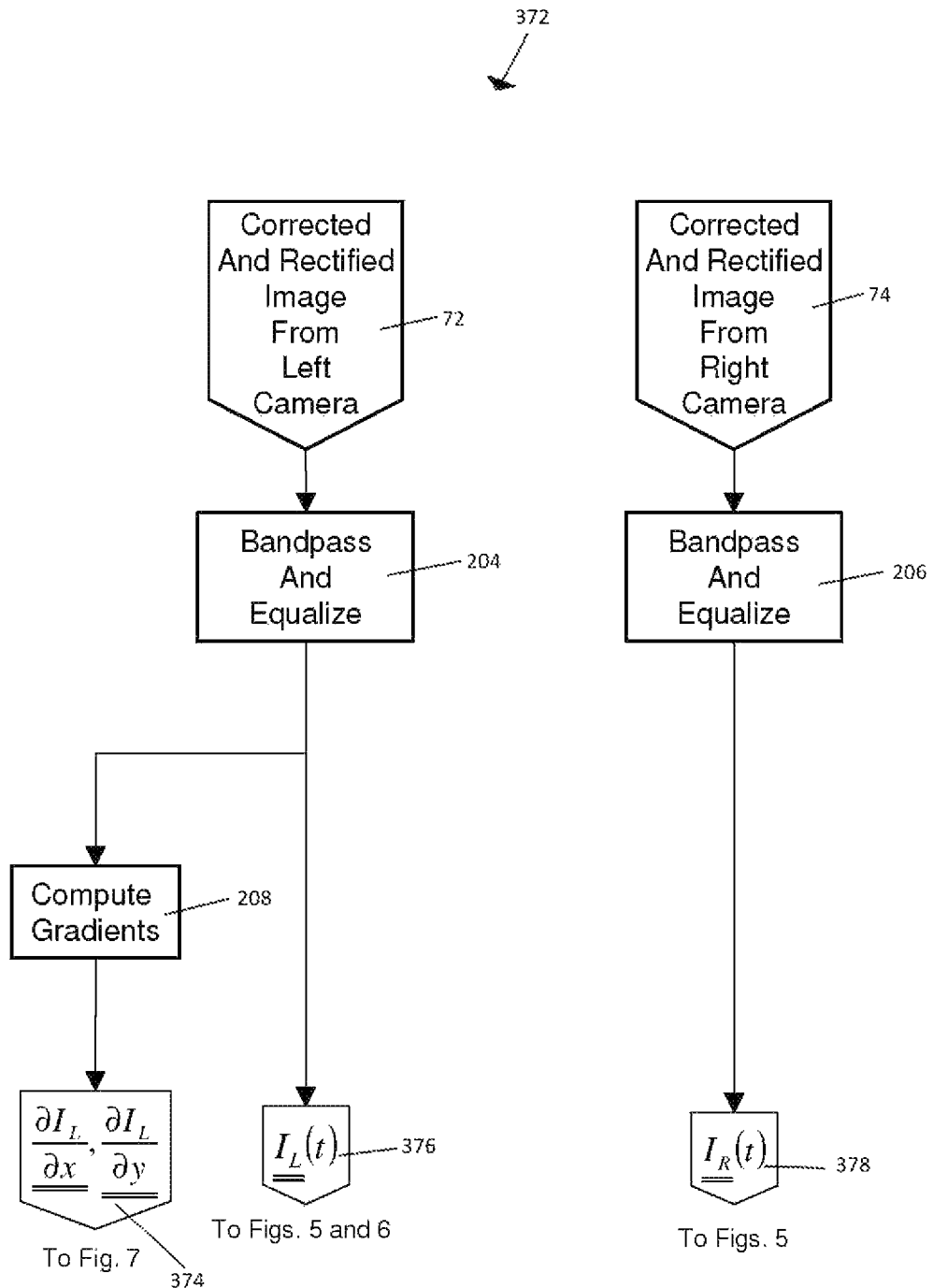
FIG. 4 is a block diagram of conventional image processing.
Figure 5:
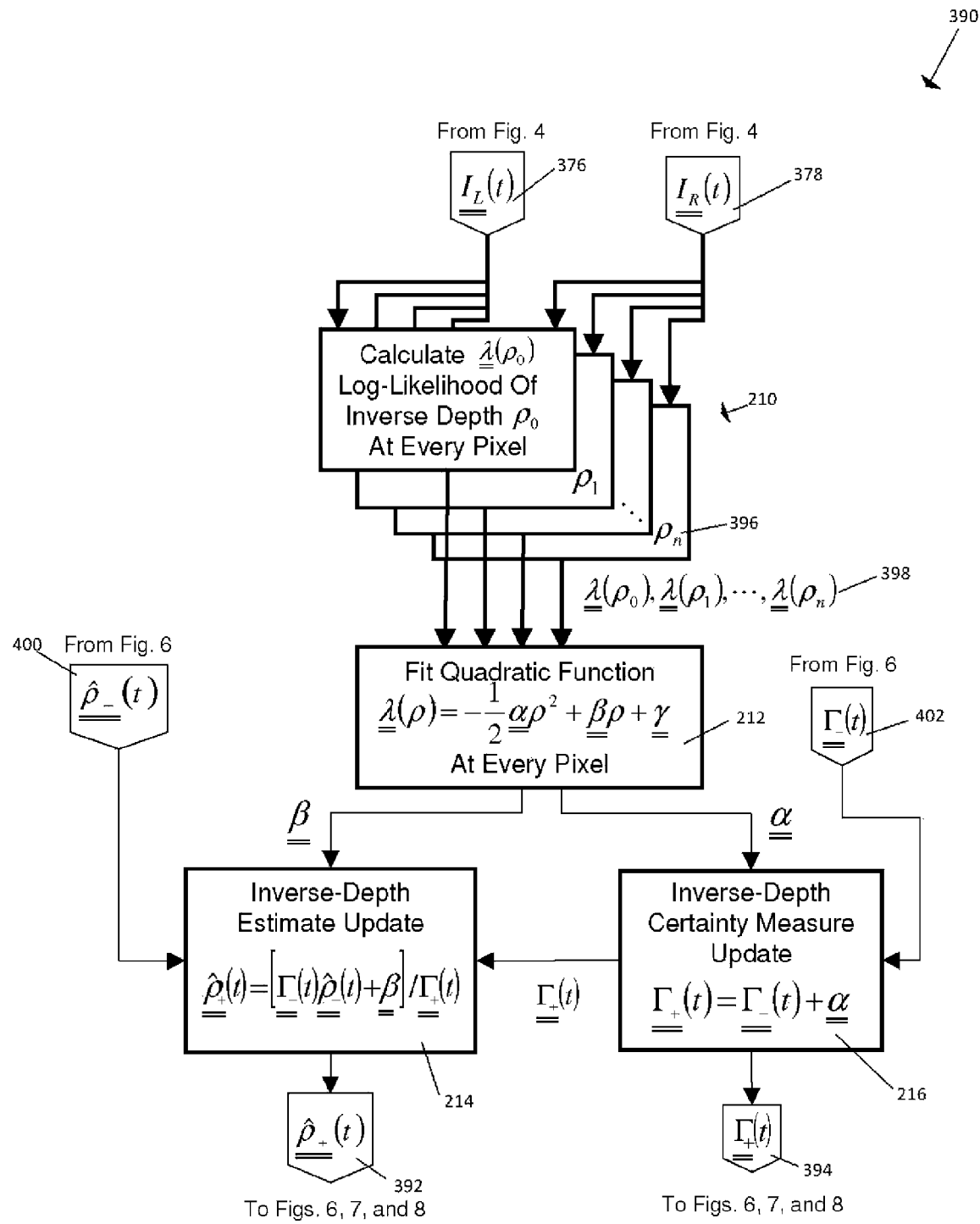
FIG. 5 is a block diagram of updating inverse depth estimates and their certainty measures in accordance with the exemplary embodiments.
Figure 6:
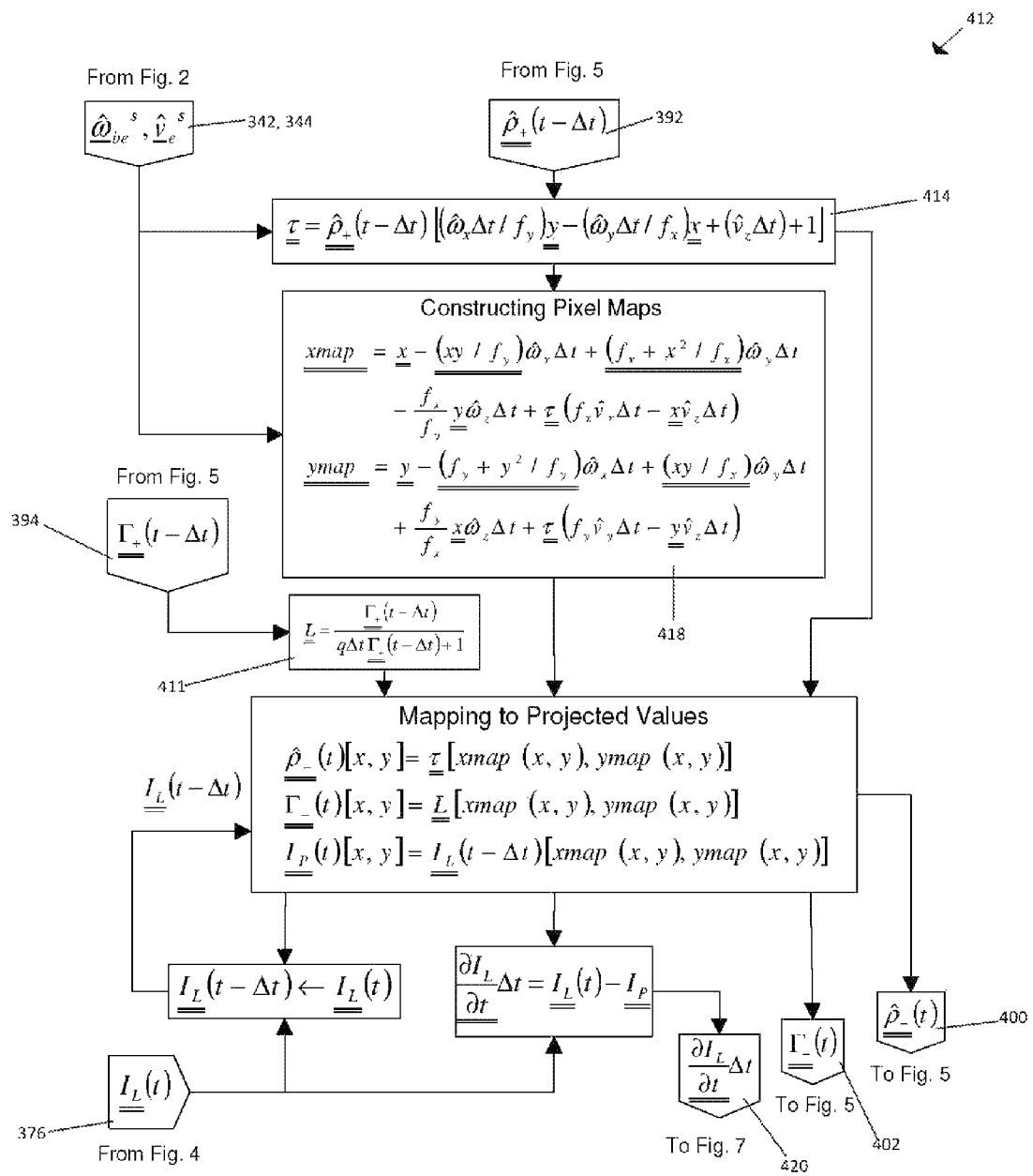
FIG. 6 is a block diagram of propagating inverse depth estimates, their certainty measures and a left image from one frame to the next.
Figure 7:
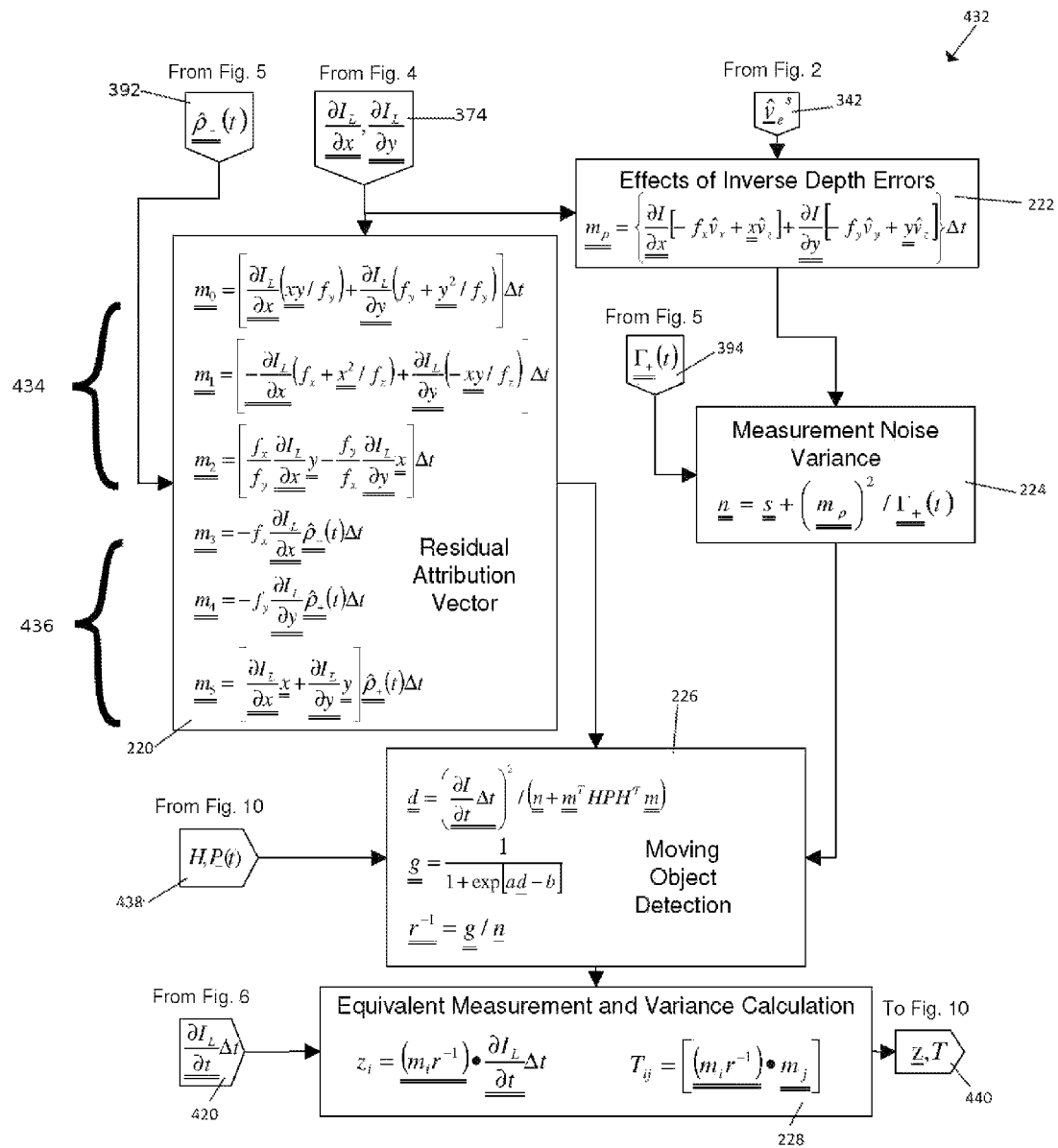
FIG. 7 is a block diagram of deriving equivalent measurements of linear and angular velocities from dense optical flow.
Figure 8:
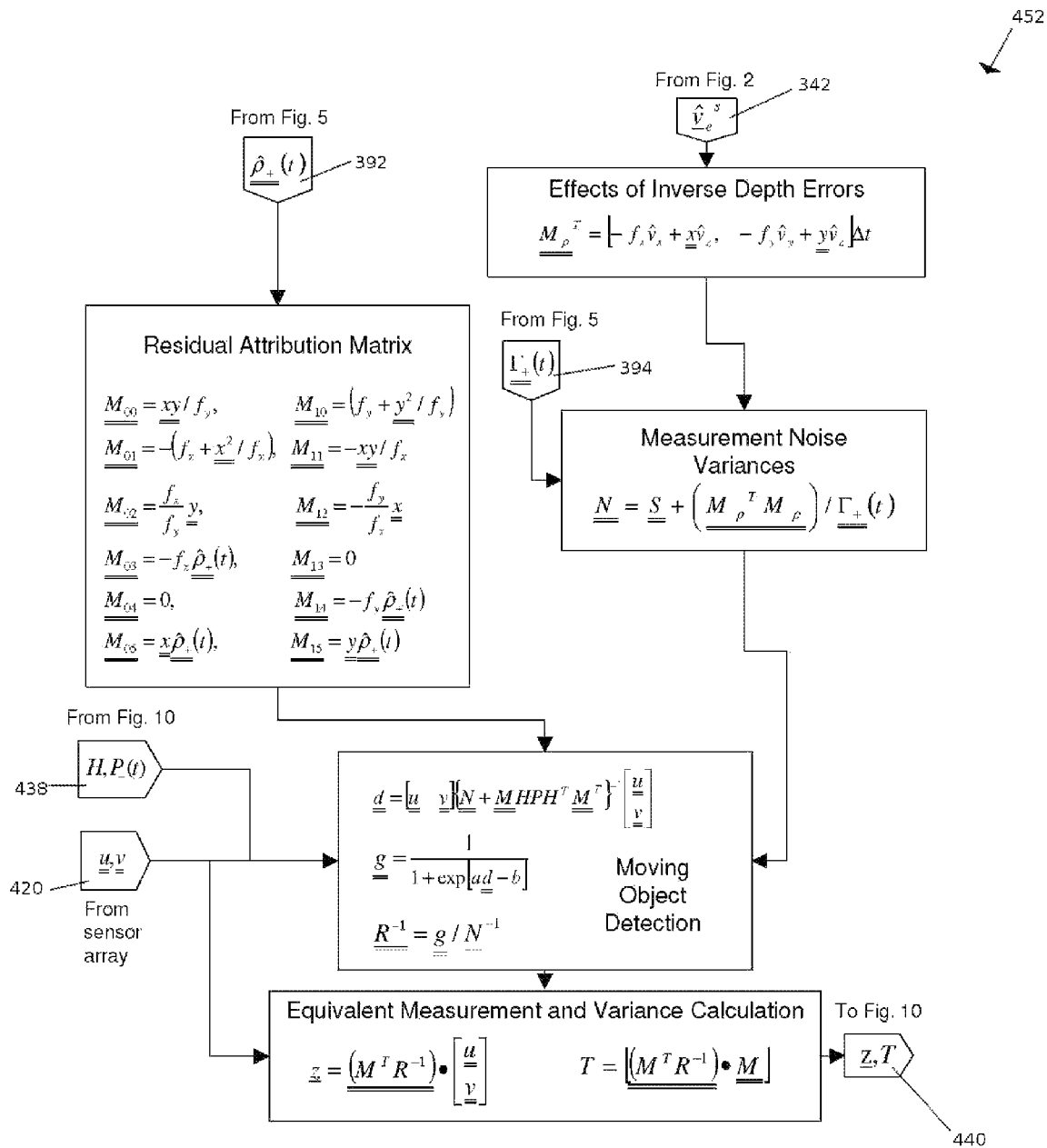
FIG. 8 is a block diagram of deriving equivalent measurements of linear and angular velocities from local image velocities in accordance with another exemplary embodiment.

In the exemplary embodiment shown in FIG. 1, kinematic measurements of frame 100 may be generated by the IMU 34, though in alternate embodiments, kinematic measurements may be sensed from other position sensor such as outer odometry, as previously noted. Inertial measurement unit 34 may contain suitable devices to measure all three axes of acceleration and all three axes of angular rotation rate. For example, inertial measurement unit 34 may contain accelerometers, gyroscopes or other suitable transducers for measurement of one or more axis of acceleration, angular velocity or otherwise. The blocks in FIG. 1 with respect to the processor platform 36 may represent calculation modules, which may be implemented within some combination of general purpose computational units, digital signal processing units, and specialized processing units, such as field programmable gate arrays or otherwise. Further, the algorithms may be structured to take full advantage of parallel processing capabilities. In one embodiment, the disclosed method may be implemented on a general purpose computer or cpu, where a method of implementation utilizes standard image processing functions, for example, in the OpenCV open-source library of functions (http://opencv.willowgarage.com) to take advantage of built-in parallel processing hardware. In the embodiment shown, signals 42 from inertial measurement unit 34 may drive inertial navigation calculations 50. A suitable example of inertial navigation calculations 50 is shown in FIG. 2 as will be described. Periodically, the inertial navigation calculations may be corrected or reset using signals and data 84 from information filter 52 where signals and data 84 may include data relating to accelerometer or gyroscope biases, body velocities, rotation, position, offsets or otherwise. Inertial navigation calculations 50 may output data 80 relating to or including estimates of specific forces and rotation and angular rates or otherwise to information filter 52 or otherwise. Inertial navigation calculations 50 may output data relating to or including sensor velocities and angular rates or otherwise to preprocessing and estimation module 58 and/or dense optical flow module 60. A suitable example of information filter 52 is shown in more detail in FIGS. 9 and 10 as will be described. Both the left and right images 38, 40 may be processed for correction and rectification 54, 56 and preprocessed to reduce sensor noises and differences in exposure where the inverse of the depth at each pixel location is estimated 58, and the certainties (or uncertainties) in these estimates may be computed. A suitable example of module 58 is shown in FIGS. 4, 5 and 6 as will be described. Pre-processing and inverse depth estimation module 58 accepts corrected and rectified image signals or data 72, 74 from correction and rectification modules 54, 56. Pre-processing and inverse depth estimation module 58 may output data 92 to dense optical flow module 60 or otherwise that may relate to or include image intensity gradients, image intensity time derivatives, inertial navigation errors, inverse depth certainty measures, or otherwise. Dense Optical Flow module 60 may input data 80, 92 or otherwise and may further input data 88 relating to or including Kalman filter state or measurement, inertial navigation error or otherwise. Further, dense Optical Flow module 60 may input data relating to image velocities at each array location or otherwise. Dense Optical Flow module 60 may output data 86 to information filter 52 or otherwise relating to angular and linear velocity errors and the inverse covariance or otherwise. Information filter 52 bases its corrections on signals derived by comparing changes in the camera images with changes predicted using inertial signals as in dense optical flow module 60. A suitable example of optical flow module 60 is shown in FIGS. 7 and 8 as will be described. Feature extraction 62, feature tracking 64 and simultaneous localization and mapping 66 are further utilized with information filter 52. In alternate embodiments, more or less modules may be provided as part of platform 20 or computation platform 36.

The following terms reflect a glossary of notations with respect to the disclosed embodiments.

⊗ Representation of quaternion multiplication.

$$\frac{\partial I_L}{\partial t}$$

Two-dimensional array of the time derivative of left image intensities (gray scale values) at each pixel.

$$\frac{\partial I_L}{\partial x}$$

Two-dimensional array of gradient of left image intensities (gray scale values) along the x (nominally horizontal) direction.

$$\frac{\partial I_L}{\partial y}$$

Two-dimensional array of gradient of left image intensities (gray scale values) along the y (nominally vertical) direction.

A Twenty-one-by-twenty-one matrix that is an approximation to the discrete-time inertial navigation error propagation matrix.

$\hat{a}_e^n$ Three-dimensional vector of estimates of body accelerations relative to the earth expressed in navigation coordinates.

$\hat{b}_a$ Three-dimensional vector of estimates of accelerometer biases.

$\hat{b}_g$ Three-dimensional vector of estimates of gyro biases.

$C_a$ Three-by-three matrix of accelerometer calibration parameters.

$C_g$ Three-by-three matrix of gyro calibration parameters.

$\underline{d}$ Two-dimensional array that represents the degree of divergence of the change in the left image relative to its anticipated variance at each pixel location.

$\hat{d}^s$ Three-dimensional vector of estimates of offsets from the origin of body coordinates to the origin of the sensor (camera) coordinates expressed in sensor coordinates.

$\hat{f}^b$ Three-dimensional vector of estimates of specific forces expressed in the body frame.

$\hat{f}^n$ Three-dimensional vector of estimates of specific forces expressed in the navigation frame.

$f_x$ Lens focal length in the horizontal direction.

$f_y$ Lens focal length in the vertical direction.

F Twenty-one-by-twenty-one error dynamics matrix that defines the differential equation for the propagation of inertial navigation errors.

$\underline{g}$ Two-dimensional array that corresponds to the probability that the object at the corresponding pixel location is not moving.

$g^n$ Three-dimensional vector of the force countering gravity expressed in the navigation frame.

H Six-by-twenty-one matrix that relates the Kalman filter state vector to the equivalent measurement vector.

I An identity matrix of a size appropriate to the equation containing it.

$\underline{I_L}(t)$ Two-dimensional array of left image intensities (gray scale values) at time t.

$\underline{I_R}(t)$ Two-dimensional array of right image intensities (gray scale values) at time t.

$\underline{I_P}(t)$ Two-dimensional array of predictions of the left image intensities (gray scale values) at time t based on accounting for inertial systems estimates of linear and angular velocities since the last left image was collected.

K Twenty-one-by-six Kalman filter matrix that distributes the equivalent measurement vector among the Kalman filter states.

$\underline{L}$ Two-dimensional array of inverse-depth certainty measures degraded by the time between measurements.

$\underline{m}$ Six-dimensional vector whose elements are two-dimensional arrays, as described below.

$\underline{m_0}$ Two-dimensional array that accounts for the effect of an error in $\omega_x$ on each image pixel.

$\underline{m_1}$ Two-dimensional array that accounts for the effect of an error in $\omega_y$ on each image pixel.

$\underline{m_2}$ Two-dimensional array that accounts for the effect of an error in $\omega_z$ on each image pixel.

$\underline{m_3}$ Two-dimensional array that accounts for the effect of an error in $v_x$ on each image pixel.

$\underline{m_4}$ Two-dimensional array that accounts for the effect of an error in $v_y$ on each image pixel.

$\underline{m_5}$ Two-dimensional array that accounts for the effect of an error in $v_z$ each image pixel.

$\underline{m_\rho}$ Two-dimensional array that accounts for the effect of an error in the inverse depth $\rho$ on each image pixel.

M Two-by-six matrix whose elements are two dimensional arrays, as described below.

$\underline{M_{00}}$ Two-dimensional array describing the effect of $\omega_x$ on u.

$\underline{M_{01}}$ Two-dimensional array describing the effect of $\omega_y$ on u.

$\underline{M_{02}}$ Two-dimensional array describing the effect of $\omega_z$ on u.

$\underline{M_{03}}$ Two-dimensional array describing the effect of $v_x$ on u.

$\underline{M_{04}}$ Two-dimensional array describing the effect of $v_y$ on u.

$\underline{M_{05}}$ Two-dimensional array describing the effect of $v_z$ u.

$\underline{M_{10}}$ Two-dimensional array describing the effect of $\omega_x$ on v.

$\underline{M_{11}}$ Two-dimensional array describing the effect of $\omega_y$ on v.

$\underline{M_{12}}$ Two-dimensional array describing the effect of $\omega_z$ on v.

$\underline{M_{13}}$ Two-dimensional array describing the effect of $v_x$ on v.

$\underline{M_{14}}$ Two-dimensional array describing the effect of $v_z$ on v.

$\underline{M_{15}}$ Two-dimensional array describing the effect of $v_z$ on v.

$\underline{M_\rho}$ Two-dimensional vector whose elements are two-dimensional arrays representing the effects of inverse depth errors on u and v.

$\underline{n}$ Two-dimensional array representing the total noise at each pixel.

N Two-by-two array whose elements represent the covariance matrix elements for the total noise at each array location.

$\hat{p}_e^n$ Three-dimensional vector of estimates of body positions relative to the earth expressed in navigation coordinates.

$P_-(t)$ Twenty-one-by-twenty-one covariance matrix for the inertial navigation errors prior to incorporation of the new equivalent measurement.

$P_+(t)$ Twenty-one-by-twenty-one covariance matrix for the inertial navigation errors after incorporation of the new equivalent measurement.

$\hat{q}$ Estimate of the quaternion relating the rotation from the body coordinates to the navigation coordinates.

q A scalar tuning parameter that adjusts how fast the inverse depth information degrades with time.

Q A twenty-one-by-twenty-one covariance matrix corresponding to inertial navigation errors that accumulate during propagation from one time to the next.

$\hat{r}$ Estimate of the quaternion relating the rotation from the body coordinates to the sensor (camera) coordinates.

$\underline{r^{-1}}$ Two-dimensional array representing the inverse of the variance of the image change at each pixel location.

$R_{nb}(\hat{q})$ Estimated direction cosine matrix transforming body coordinates to navigation coordinates.

$R_{sb}(\hat{r})$ Estimated direction cosine matrix transforming body coordinates to sensor (camera) coordinates.

$\underline{s}$ Two-dimensional array representing the variance of the sensor noise at each pixel.

S Two-by-two matrix whose elements are two-dimensional arrays representing elements of the sensor error covariance matrix at each array location.

T Six-by-Six matrix representing the inverse of the covariance of the error in the equivalent measurement vector z.

$T_{ij}$ The $ih^{th}$ component of the matrix T.

$\underline{u}$ Two-dimensional array representing the local y (vertical) image velocity at each array location.

$\underline{v}$ Two-dimensional array representing the local x (horizontal) image velocity at each array location.

$\hat{v}_e^b$ Three-dimensional vector of estimates of body velocities relative to the earth expressed in body coordinates.

$\hat{v}_e^n$ Three-dimensional vector of estimates of body velocities relative to the earth expressed in navigation coordinates.

$\hat{v}_e^s$ Three-dimensional vector of estimate of sensor velocities relative to the earth expressed in sensor coordinates.

$\hat{v}_x$ x component of $\hat{v}_e^s$.

$\hat{v}_y$ y component of $\hat{v}_e^s$.

$\hat{v}_z$ z component of $\hat{v}_e^s$.

$\hat{x}$ The twenty-one dimensional vector of corrections to the inertial navigation equations.

$\underline{x}$ Two-dimensional array with each element containing x, nominally the horizontal location in the image of that pixel.

$x^2$ Two-dimensional array with each element containing $x^2$, the square of the x (horizontal) location in the image of that pixel.

$\overline{xy}$ Two-dimensional (pixel-by-pixel) array with each element containing xy, the product of the x (horizontal) and y (vertical) location in the image of that pixel.

$\overline{y}$ Two-dimensional array with each element containing y, nominally the vertical location in the image of that pixel.

$\overline{y^2}$ Two-dimensional array with each element containing $y^2$, the square of the y (vertical) location in the image of that pixel.

$\overline{xmap}$ Two-dimensional array that gives the x location of the pixel in the prior array to map to the pixel in the current array.

$\overline{ymap}$ Two-dimensional array that gives the y location of the pixel in the prior array to map to the pixel in current array.

z Six-dimensional equivalent measurement vector that reflects the angular and linear velocity estimation errors.

$z_i$ The $i^{th}$ component of the z vector.

$\overline{\overline{\alpha}}$ a Two-dimensional array of second-order coefficients for quadratic fit to the inverse-depth log-likelihood function.

$\overline{\overline{\beta}}$ Two-dimensional array of first-order coefficients for quadratic fit to the inverse-depth log-likelihood function.

$\overline{\overline{\gamma}}$ Two-dimensional array of zeroth-order coefficients for quadratic fit to the inverse-depth log-likelihood function.

$\overline{\overline{\Gamma_-}}(t)$ Two-dimensional array of inverse-depth certainty measures based on data prior to time t.

$\overline{\overline{\Gamma_+}}(t)$ Two-dimensional array of inverse-depth certainty measures based on data up to and including time t.

$\delta b_a$ Three-dimensional vector of estimated errors in accelerometer drift compensations.

$\delta d_g$ Three-dimensional vector of estimated errors in gyro drift compensations.

$\delta p^s$ Three-dimensional vector of estimated linear alignment errors between body and sensor.

$\delta p_e^n$ Three-dimensional vector of estimated position errors.

$\delta v_e^n$ Three-dimensional vector of estimated velocity errors.

$\Delta t$ Time step between images.

$\epsilon_{sb}^s$ Three-dimensional vector of estimated rotational alignment errors between body and sensor frames.

$\theta_{bn}^n$ Three-dimensional vector of estimated attitude errors between navigation and body frames.

$\lambda(\rho)$ Two-dimensional array of log-likelihood of the inverse depth value ρ at each pixel.

$\hat{\rho}_-(t)$ Two-dimensional array of estimates of inverse depth based on data prior to time t.

$\hat{\rho}_+(t)$ Two-dimensional array of estimates of inverse depth based on data up to and including time t.

τ Two-dimensional array of estimates of inverse depth that accounts for the change perspective projection due to vehicle motion.

$\hat{\omega}_{be}^b$ Three-dimensional vector of estimates of angular rates from the earth frame to the body frame as expressed in the body frame.

$\hat{\omega}_{be}^s$ Three-dimensional vector of estimates of angular rates from the earth frame to the body frame as expressed in the sensor (camera) frame.

$\hat{\omega}_{bi}^b$ Three-dimensional vector of estimates of angular rates from the inertial frame to the body frame as expressed in the body frame.

$\hat{\omega}_{ei}^b$ Three-dimensional vector of estimates of angular rates from the inertial frame to the earth frame as expressed in the body frame.

$\hat{\omega}_{ei}^n$ Three-dimensional vector of estimates of angular rates from the inertial frame to the earth frame as expressed in the navigation frame.

$\hat{\omega}_{nb}^b$ Three-dimensional vector of estimates of angular rates from the body frame to the navigation frame as expressed in the body frame.

$\hat{\omega}_{ne}^b$ Three-dimensional vector of estimates of angular rates from the earth frame to the navigation frame as expressed in the body frame.

$\hat{\omega}_{ne}^n$ Three-dimensional vector of estimates of angular rates from the earth frame to the navigation frame as expressed in the navigation frame.

$\hat{\omega}_x$ x component of $\hat{\omega}_{be}^s$.

$\hat{\omega}_y$ y component of $\hat{\omega}_{be}^s$.

$\hat{\omega}_z$ z component of $\hat{\omega}_{be}^s$.

Referring now to FIG. 2, there is shown a block diagram of signal flow for an inertial navigation calculation 50, which may provide suitable information for the machine vision system 33 as will be described further below. The exemplary signal flow diagram is for a strapdown inertial measurement unit, where the inertial instruments and the cameras may be hard mounted to the same rigid body. For simplicity, the calculations shown do not account for earth curvature or effects such the Coriolis effect. In alternate embodiments, such effects may be accounted for. These omissions may be justified for low-speed navigation within a limited area. If necessary, additional terms may be added to account these effects without affecting the rest of the calculations described below. Gyros 200 may measure the angular rates of body relative to an inertial frame. The raw gyro signals may be corrected for misalignments and scale factor errors by the calibration matrix $C_g$ 300. This calibration matrix may be determined by standard laboratory calibration methods. In the exemplary embodiment, the calibrated gyro signals are corrected for drifts by the vector $\hat{b}_g$, 302 which is estimated during real-time operation as will be described further below. The result is the vector $\hat{\omega}_{bi}^b$, 304 which estimates of the angular rates from the inertial frame to the body frame as seen in the body frame. The rotation of the earth is accounted for by subtracting the earth rate $\hat{\omega}_{ei}^b$, 307. To utilize sensor, for example, camera information, this angular rate vector is transformed to the sensor coordinates by the direction cosine matrix $R_{sb}(\hat{r})$, 306. This direction cosine matrix is derived from a unit quaternion representation $\hat{r}$ 336 of the rotational alignment of the sensor frame relative to the body frame. The method of deriving a direction cosine matrix from a quaternion is explained below. The raw signals from the accelerometers 202 may be corrected for misalignments and scale factor errors by the calibration matrix $C_a$, 308 which also can be determined by standard laboratory calibration methods. In accordance with the exemplary embodiment, the calibrated signals are corrected for drifts by the vector $\hat{b}_a$, 310 which is estimated during real-time operation as will be described further below. These corrections produce an estimate of the specific force vector in the body coordinate frame $\hat{f}^b$, 312. This vector is transformed from the body frame to a vector in the navigation coordinate frame, $\hat{f}^n$ 314 by the direction cosine matrix $R_{nb}(\hat{q})$, 316. This direction cosine matrix is derived from a unit quaternion representation $\hat{q}$ 338 of the rotational alignment of the body frame relative to the navigation coordinate frame. The accelerometers may measure specific forces applied to the body, which are the combination of the forces countering gravity and forces that are accelerating the body. Based on the estimated position, an estimate of the effect of the force countering gravity can be used to compensate the specific force measurements to estimate the acceleration vector $\hat{a}_e^n$, 318. The estimated acceleration vector is integrated to estimate the velocity vector $\hat{v}_e^n$ 320, which in turn is integrated to produce an estimate of the position vector $\hat{p}_e^n$ 322. To estimate the linear velocity in the sensor frame, the vector $\hat{v}_e^n$ 320 is transformed first by $R_{nb}(\hat{q})^T$ 324 to produce $\hat{v}_e^b$ 326, and then transformed to sensor coordinates by $R_{sb}(\hat{r})$ 328. The algorithm accounts for the estimated linear offset $\hat{d}^s$ 330 of the sensor frame from the body frame by adding $\hat{\omega}_{be}^s \times \hat{d}^s$ 332. The estimate of the angular rotation is maintained by integrating the quaternion product $\hat{q} \otimes (0, 0.5 \hat{v}_{nb}^b)$. Transformation (IMU to sensor) portion 340 outputs $\overline{\overline{v}}_e^s$ 342, an estimate of sensor velocities relative to the earth expressed in sensor coordinates, and $\hat{\omega}_{be}^s$ 344, an estimate of angular rates from the earth frame to the body frame as expressed in the sensor (camera) frame, to preprocessing and inverse depth estimation module 58 and dense optical flow module 60, or otherwise. Further, inertial navigation module 50 outputs $\hat{f}^n$ 314, a vector of estimates of specific forces expressed in the navigation frame, and $\hat{q}$ 338, an estimate of the quaternion relating the rotation from the body coordinates, to the navigation coordinates to information filter 52, or otherwise. A fourth-order Runge-Kutta algorithm may be a method for computing a numerical solution to the differential equations defined by FIG. 2. In the exemplary embodiment, quantities shown in dashed circles may be updated and/or reset by information filter 52 as will be described with respect to FIG. 9, or otherwise. In alternate embodiments, more or less modules may be provided as part of inertial navigation module 50.

Figure 3:
FIG. 3 is a block diagram of conventional quaternion properties and operations.

Referring now to FIG. 3, there is shown is a block diagram of exemplary quaternion properties and operations 70. In the embodiment shown, the properties and operations of quaternions may be used for tracking the attitude of the system 20. Quaternions may be conventionally represented 362 by four real numbers, which can be grouped into a scalar and a three-dimensional vector. The product 364 of two quaternions $q \otimes p$ is a quaternion that is determined by the equations shown in FIG. 3. A rotation is represented by a quaternion of unit length. The effect of the rotation q on a vector is determined by the three-dimensional direction cosine matrix R(q) 366 defined by the equations in FIG. 3. In alternate embodiments, more or less modules may be provided.

Referring now to FIG. 4, there is shown a block diagram of image processing portion 372 of processing and inverse depth estimation module 58. In the embodiment shown, image preprocessing may be used to prepare camera images for further processing such as inverse depth estimation. Prior to this processing, methods (Bradsky, G. and Kaeler, A., Learning OpenCV, O'Reilly 2008) may be used to correct 54, 58 images gathered by camera 30, 32 for distortions and to transform the images to rectified coordinates so that a finite object depth results in a horizontal displacement between the left and right images. Both images 72, 74 may be put through bandpass filters 204, 206 to reduce sensor noise and to reduce the effects of brightness variations between the two cameras. In alternate embodiments, any suitable filtering may be provided. Some form of equalization, such as histogram equalization, may be used to reduce the effects of contrast variations between the two cameras. At this stage, computation of the x (horizontal) and y (vertical) gradients 208 of the left image for use in later computations may be accomplished. On a general purpose computer or otherwise, the implementation of these operations is to use image processing methods, for example, available in the OpenCV library, which take advantage of parallel computation. The dense optical flow computations, in accordance with the exemplary embodiments, will be described below. The method employs estimates of the inverse of the depth corresponding for every pixel in the left (or reference) image. For a fully Bayesian implementation, it may also use a quantification of the certainties in these estimates. Image processing portion 372 of processing and inverse depth estimation module 58 generates outputs 374, $$\frac{\partial I_L}{\partial x}$$

an array of gradient of left image intensities (gray scale values) along the x (nominally horizontal) direction, and $$\frac{\partial I_L}{\partial y}$$

an array of gradient of left image intensities (gray scale values) along the y (nominally vertical) direction, to dense optical flow module 60, or otherwise. Image processing portion 372 of processing and inverse depth estimation module 58 outputs $\underline{\underline{I}}_L(t)$ 376, an array of left image intensities (gray scale values) at time t and $\underline{\underline{I}}_R(t)$ 378, an array of right image intensities (gray scale values) at time t to further portions of inverse depth estimation module 58 as will be described. In alternate embodiments, more or less modules may be provided.

Referring now to FIG. 5, there is shown a block diagram of updating inverse depth estimates and their certainty measures portion 390 of inverse depth estimation module 58. Here, a procedure for updating inverse-depth estimates for points in the scene and the associated information measures is shown as a method for fitting a Gaussian distribution to the probability of the inverse depth at every pixel. This algorithm may produce two arrays of real numbers arranged in the same configuration as the image pixels. One array of real numbers, $\hat{\rho}_+(t)$, 392 represents the best estimates of the inverse depth at time t after the images have been analyzed where, $\hat{\rho}_+(t)$, 392 is utilized in dense optical flow module 60 and further in inverse depth estimation module 58. In the embodiment shown, the double underscore may indicate that the quantity is a two-dimensional array. Each element of the other two-dimensional array $\Gamma_+(t)$ 394 may represent the certainty (inverse of the variance) of the estimate at the corresponding pixel, where $\Gamma_+(t)$ 394 is utilized in dense optical flow module 60 and further in inverse depth estimation module 58. An element of this array is called a certainty, for the purpose of description, because a value of zero corresponds to an infinite variance, indicating that there is no certainty in the corresponding inverse depth estimate and it conveys no useful information. A larger value indicates more certainty in the estimate and more useful information. The algorithm for computing these arrays may begin with the calculations represented by the set of boxes 210 near the top of FIG. 5. Each of these boxes represents the calculation of the logarithm of the likelihood of a particular inverse depth. For a chosen inverse depth ρ 396, a log-likelihood number may be computed for every pixel. These calculations may be accomplished by first shifting the right image relative to the left image by an amount corresponding to the inverse depth being considered. The amount of shift corresponding to a specific inverse depth is determined by standard methods from knowledge of the camera focal lengths and the baseline between cameras. Next the degree of correspondence at each pixel may be measured by methods such as the sum of the absolute differences or the sum of squared differences over a neighborhood around the pixel. The computations in each box of this set results in a two-dimensional array $\underline{\lambda}(\rho_i)$ 396 where each location in the array is viewed as the logarithm of the likelihood that the inverse depth $\rho_i$ 396 is correct for that pixel location. To summarize this information, the algorithm may fit a quadratic function $$\underline{\lambda}(\rho) = -\frac{1}{2}\underline{\alpha}\rho^2 + \underline{\beta}\rho + \underline{\gamma}$$

212 at every pixel. This can be done using standard least squares methods or it can be done by fitting a quadratic function at the maximum of the likelihood function using $$\left(\frac{\partial I}{\partial x}\right)^2$$

to determine the curvature. With either approach, image processing algorithms may be used to perform these calculations in parallel. At each pixel location, this quadratic function may be viewed as the logarithm of a Gaussian distribution. Here and below, double-underscored variables may represent two dimensional arrays and the equations containing double-underscored variables apply at each location in the arrays. To improve accuracy, the method may carry knowledge from one time to the next. Boxes 214, 216 at the bottom of FIG. 5 provide the equations for updating the inverse-depth estimates and the corresponding certainty measures. Using image processing techniques, these equations can be implemented for all pixel locations in parallel and may utilize $\underline{\rho}_-(t)$ 400, an array of estimates of inverse depth based on data prior to time t and $\underline{\Gamma}_-(t)$402, an array of inverse-depth certainty measures based on data prior to time t from FIG. 6. In alternate embodiments, more or less modules may be provided.

Referring now to FIG. 6, there is shown a block diagram of a procedure for propagating inverse depth estimates, their certainty measures and a left image from one time or frame to the next portion 412 of inverse depth estimation module 58. These algorithms utilize estimates of the linear and angular velocities to predict the changes in these quantities. First the equation computes $\underline{\tau}$ 414, the incremental change in the depth resulting from perspective changes due to linear motion along the optical axis and angular velocities orthogonal to it. In many applications, the terms involving the angular velocities are negligible and can be omitted. It also computes $\underline{L}$ 416, which represents the time evolution of the certainty measures. The factor q controls how the certainty degrades with time; larger values of q result in more degradation. Additional changes due to camera motion are accounted for by constructing two two-dimensional pixel maps or arrays of real numbers xmap and ymap 418 that map how image elements are expected to move from one time to the next. The estimated linear and angular velocities during the time interval are used to determine these maps using the equations shown in the second block of FIG. 6. The quantities $f_x$ and $f_y$ represent the effective focal lengths in the x and y directions. To determine what to expect at a specific pixel coordinate (x,y) at time t, the method looks at the location with x coordinate xmap(x,y) and y coordinate ymap(x,y) in the corresponding quantity at time t−Δt. In the exemplary embodiment, these maps may be composed of real numbers, and hence the locations indicated may not fall at integral pixel locations. In that case, bilinear interpolation may be used to determine the quantity sought. These methods are used to compute projections of the expected inverse depth, the information measures, and the left image.

The differences between the actual left image and its projection may be used to approximate $$\frac{\partial I_L}{\partial t}\Delta t \; 420,$$

which is the array of residual errors used in the dense optical flow calculations and which may be output to dense optical flow module 60 or otherwise.

Referring now to FIG. 7, there is shown a block diagram of deriving equivalent measurements of linear and angular velocities from and using dense optical flow portion 432 of dense optical flow module 60. As indicated in the left-hand residual attribution vector block 220 of FIG. 7, the estimates of the inverse depth and the image gradients are used to compute six two-dimensional arrays of real numbers that attribute residual errors in the image predictions to errors in the angular and linear velocity estimates. In the exemplary embodiment, the first three arrays, $\underline{m}_0$, $\underline{m}_1$, and $\underline{m}_2$, 434 relate errors in the x, y, and z components of the angular velocity to the image residuals. The final three arrays 436 relate the x, y, and z components of the linear velocity to the image residuals. The calculations in the effect of inverse depth errors block 222 in FIG. 7, combine the velocity estimates and the focal lengths with the image gradients to determine the effects of errors in the estimates of the inverse depth. In the measurement noise variance block 224, the two-dimensional array of noise variances is computed using these quantities and the certainty measure array. The scalar s accounts for signal noise of the vision system, for example camera noise. To detect moving objects 226, the exemplary method computes the probability that points in the image correspond to static rather than moving objects. For example, moving object detection block 226 utilizes data 438, such as H, a matrix that relates the Kalman filter state vector to the equivalent measurement vector and P_(t), a covariance matrix for the inertial navigation errors prior to incorporation of the new equivalent measurement from information filter 52. Block 226 computes a quantity d that corresponds to the deviation from the expected variation of the residual. To compute this quantity, the method may take the ratio of the square of the residual to the variance that is anticipated if the object is static. The probability that the image pixel corresponds to a static object is computed by a weighted logistic function. Dealing with moving objects is accomplished by using the resulting values to weight the inverse of the residual noise variances. If the deviation is much larger than expected, the weight will be near zero and the corresponding measurement will be effectively ignored. In equivalent measurement and variance calculation block 228, an equivalent measurement vector relating to the linear and angular velocities is computed by performing an pixel-by-pixel multiplication of the attribution vectors by the inverse of the residual noise variances and then performing a dot product of each of the resulting arrays with the residual array. As shown at the bottom 228 of FIG. 7, in the exemplary embodiment the inverse covariance matrix T for these equivalent measurements is computed using similar methods. Equivalent measurement and variance calculation block 228 outputs data 440 having z, an equivalent measurement vector that reflects the angular and linear velocity estimation errors and T, a matrix representing the inverse of the covariance of the error in the equivalent measurement vector z to information filter 52.

Referring now to FIG. 8, there is shown a block diagram of a method for deriving equivalent measurements of linear and angular velocities from local image velocities 452 portion of dense optical flow module 60 in accordance with another exemplary embodiment. Some low-level optical flow algorithms produce a two-dimensional vector at each pixel that represents the local image velocities. Similarly and as previously described, an array of cameras constructed from optical mouse integrated circuits may produce an array of two dimensional velocity vectors. FIG. 8 shows how the algorithm described above reference to FIG. 7, may be adapted to utilize an array of two-dimensional velocity vectors. The structure is similar to that shown in FIG. 7 except that vectors are replaced with matrices in some of the intermediate calculations. As with the dense optical flow implementation of FIG. 7, the result is an equivalent measurement vector relating to the linear and angular velocities and the associated inverse covariance matrix. In alternate embodiments, more or less modules may be provided.

Figure 9:
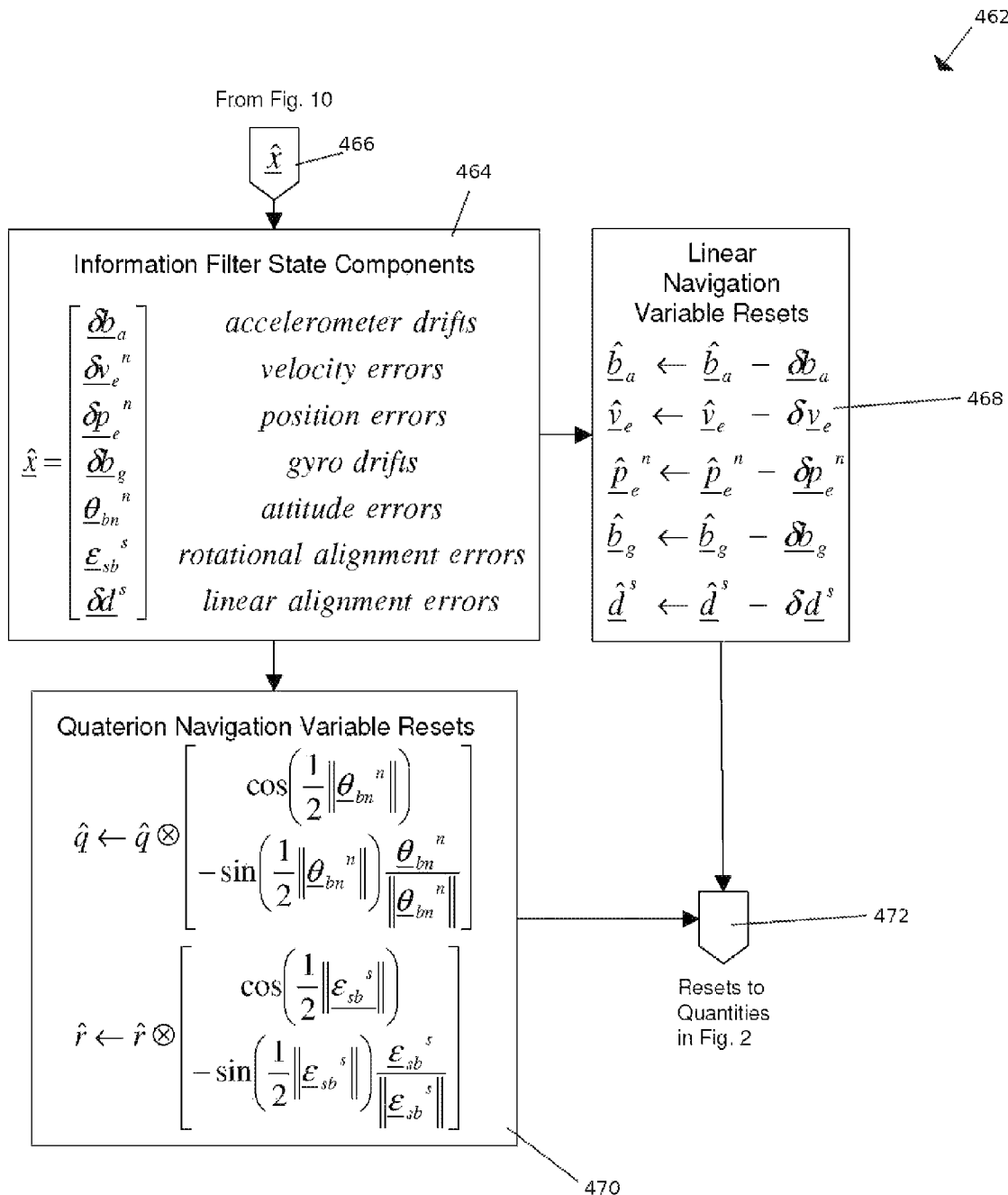
FIG. 9 is a block diagram of use of information filter outputs to reset navigation computations.

Referring now to FIG. 9, there is shown a block diagram 462 in accordance with the exemplary embodiment, showing use of information filter outputs to reset navigation computations where FIG. 9 shows the methods for using states from the information filter 52 (see also FIG. 1) to update the navigation calculations. Further, the equivalent measurements of the linear and angular velocities, such as from the optical flow module as described previously, are fed to the information filter 52 (see also FIG. 10). The outputs 472 of the information filter may be used to reset the estimates in the navigation calculations module 50 (FIG. 1), as also indicated by dashed circles in FIG. 2, for example, variables 302, 310, 320, 322, 330, 336, 338 or otherwise. The states of the information filter are related to the errors in elements of the navigation calculations by the upper left block information filter state components 464 in FIG. 9 that may accept $\hat{x}$, a vector of corrections to the inertial navigation equations from FIG. 10. The top right linear navigation variable resets block 468 shows that most of the error estimates from the information filter are simply subtracted from the corresponding quantities in the navigation computations. The quaternions in the navigation computations may be treated differently. They are updated using the quaternion multiplications shown in the bottom quaternion navigation variable resets block 470 of FIG. 9. In alternate embodiments, more or less modules may be provided.

Figure 10:
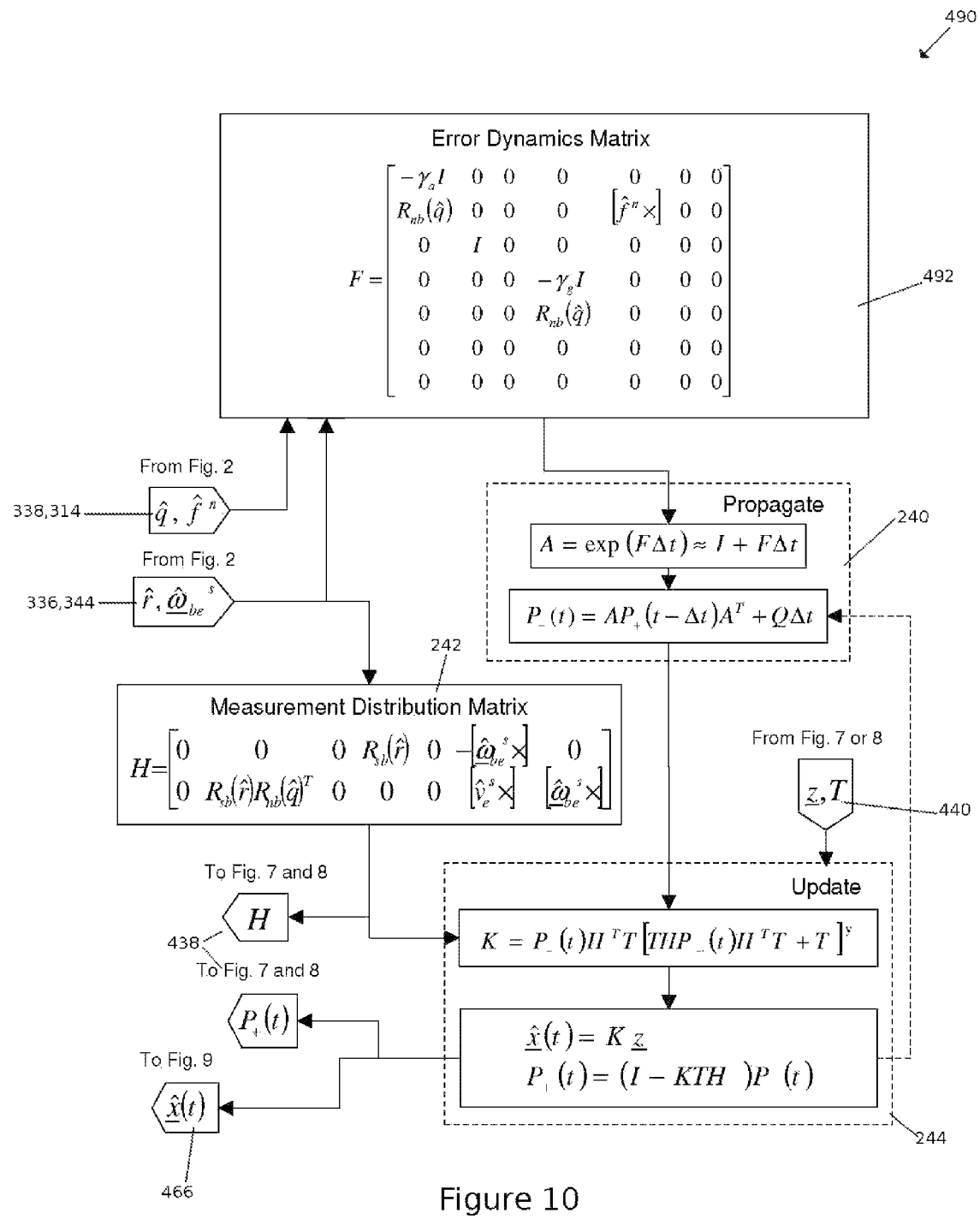
FIG. 10 is a block diagram of information filter signal flow.

Referring now to FIG. 10, there is shown a block diagram of information filter signal flow 490 of information filter 52 where FIG. 10 illustrates an exemplary signal flow within information filter 52. The 'propagate' block 240 in FIG. 10 shows how the certainties (uncertainties) from error dynamic matrix 492 and block 244 in the navigation errors propagate from one time to the next. The measurement distribution matrix 242 determines how the equivalent measurements computed from dense optical flow or local image velocities should be distributed to all of the information filter states. Finally, the bottom block 244 in FIG. 10 shows how the estimates of the navigation errors and their associated error covariance matrix are computed. In alternate embodiments, more or less modules may be provided.

Figure 11:
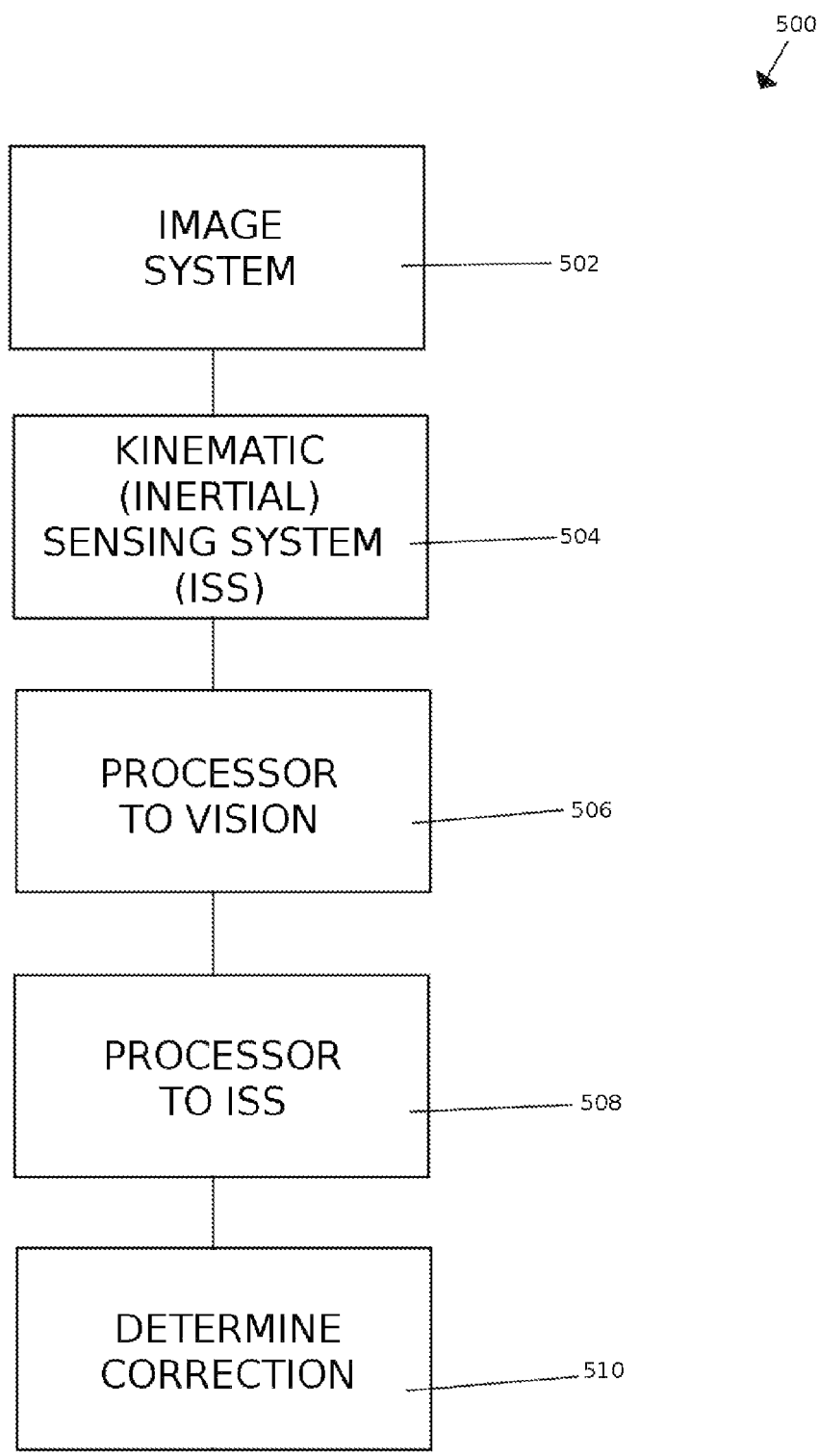
FIG. 11 is a block diagram of a method in accordance with the exemplary embodiment.

Referring now to FIG. 11, there is shown an exemplary method of guidance for a moving frame 500 pursuant to the navigation system described herein. As described, an imaging system may be disposed on the frame block 502. Also, a kinematic (e.g. inertial) sensing system coupled to the frame and configured for sensing movement of the frame is provided in block 504. Block 506 provides a processor communicably connected to the vision system for receiving image data from the vision system and generating optical flow (for example device optical flow) from image data of frame surrounding. Block 508 provides communicably connecting the processor to the inertial sensing system for receiving motion data of the frame from the inertial sensing system. Block 510 provides configuring the processor for determining, from motion aided dense optical flow, a correction to frame kinematic errors, due to errors in motion data from the inertial sensing system.

The combination of the calculations described in, for example, FIGS. 2, 9, and 10 or otherwise may form what may be described as an extended Kalman filter because nonlinear equations are used to keep track of inertial navigation states, but linearized equations are used to track the build up of uncertainties. These linearizations are justified as long as the errors in the inertial navigation states are kept small where keeping these errors small may be an objective of the combining vision and inertial measurements.

In accordance with the exemplary embodiment, an automated guidance system for a moving frame is provided. The automated guidance system has an imaging system disposed on the frame; a motion sensing system coupled to the frame and configured for sensing movement of the frame; and a processor communicably connected to the vision system for receiving image data from the vision system and generating optical flow from image data of frame surrounding. The processor is communicably connected to the motion sensing system for receiving motion data of the frame from the motion sensing system. The processor is configured for determining, from kinematically aided dense optical flow, a correction to frame kinematic errors, due to errors in motion data from the motion sensing system.

In accordance with the exemplary embodiment, an autonomous navigation system for a moving frame is provided. The autonomous navigation system has a machine vision system rigidly coupled to the frame and an inertial measurement system rigidly coupled to the frame. A processor is connected to the machine vision system for receiving image data from image pixels of the machine vision system. The processor is connected to the inertial measurement system for receiving inertial measurement data corresponding to frame movement. The processor is configured to determine a predicted change in intensity of each image pixel from the inertial measurement data. The processor is configured to use a deviation of an observed intensity change of each image pixel from the predicted change in intensity of each image pixel to correct an inertial system error.

In accordance with the exemplary method, a method of guidance for a moving frame is provided. The method has a step of providing an imaging system disposed on the frame. The method has a step of providing an inertial sensing system coupled to the frame and configured for sensing movement of the frame. The method has a step of providing a processor communicably connected to the vision system for receiving image data from the vision system and generating optical flow from image data of frame surrounding. The method has a step of communicably connecting the processor to the inertial sensing system for receiving motion data of the frame from the inertial sensing system. The method has a step of configuring the processor for determining, from motion aided dense optical flow, a correction to frame kinematic errors, due to errors in motion data from the inertial sensing system.

It should be understood that the foregoing description is only illustrative of the invention. Various alternatives and modifications can be devised by those skilled in the art with-

What is claimed is:

1. An automated guidance system for a moving frame comprising:
    an imaging system disposed on the frame;
    a motion sensing system coupled to the frame and configured for sensing movement of the frame; and
    a processor communicably connected to the vision system for receiving image data from the vision system and generating optical flow from image data of frame surrounding;
    the processor being communicably connected to the motion sensing system for receiving motion data of the frame from the motion sensing system;
    wherein the processor is configured for determining, from kinematically aided dense optical flow, a correction to frame kinematic errors, due to errors in motion data from the motion sensing system.

2. The automated guidance system of claim 1, wherein the motion sensing system is an inertial sensing system.

3. The automated guidance system of claim 1, wherein the processor is configured to estimate data with changes from motion data, and wherein the processor tracks substantially all certainties within the image data and quantifies each certainty.

4. The automated guidance system of claim 1, wherein the processor is configured to compare observed changes in image data with estimated image data changes.

5. The automated guidance system of claim 1, wherein the processor is configured to estimate an inverse of a depth and quantify a certainty at each image pixel in the image data.

6. The automated guidance system of claim 1, wherein the processor is configured to derive inertial measurements from the motion data and use the inertial measurements to predict a change in image intensity of the image data.

7. The automated guidance system of claim 1, wherein the processor is configured to estimate local image velocities from the image data and utilize the local image velocities to produce an equivalent measurement of frame linear and angular velocities.

8. An autonomous navigation system for a moving frame comprising:
    a machine vision system rigidly coupled to the frame;
    an inertial measurement system rigidly coupled to the frame;
    a processor connected to the machine vision system for receiving image data from image pixels of the machine vision system; and
    the processor connected to the inertial measurement system for receiving inertial measurement data corresponding to frame movement;
    wherein, the processor is configured to determine a predicted change in intensity of each image pixel from the inertial measurement data, and wherein the processor is configured to use a deviation of an observed intensity change of each image pixel from the predicted change in intensity of each image pixel to correct an inertial system error.

9. The autonomous navigation system of claim 8, wherein the processor is configured to estimate an inverse of a depth and quantify a certainty at each image pixel in the image data.

10. The autonomous navigation system of claim 8, wherein the processor is configured to estimate data with changes from the inertial measurement data, and wherein the processor tracks substantially all certainties within the image data and quantifies each certainty.

11. The autonomous navigation system of claim 8, wherein the processor is configured to estimate local image velocities from the image data and utilize the local image velocities to produce an equivalent measurement of frame linear and angular velocities.

12. The autonomous navigation system of claim 8, wherein the machine vision system comprises two cameras.

13. The autonomous navigation system of claim 8, wherein the inertial measurement system comprises an accelerometer and a gyroscope.

14. A method of guidance for a moving frame comprising:
    providing an imaging system disposed on the frame;
    providing an inertial sensing system coupled to the frame and configured for sensing movement of the frame;
    providing a processor communicably connected to the vision system for receiving image data from the vision system and generating optical flow from image data of frame surrounding;
    communicably connecting the processor to the inertial sensing system for receiving motion data of the frame from the inertial sensing system; and
    configuring the processor for determining, from motion aided dense optical flow, a correction to frame kinematic errors, due to errors in motion data from the inertial sensing system.

15. The method of claim 14, further comprising configuring the processor to track substantially all certainties within the image data and quantify each certainty.

16. The method of claim 14, further comprising configuring the processor to compare observed changes in image data with estimated image data changes.

17. The method of claim 14, further comprising configuring the processor to estimate an inverse of a depth and an uncertainty at each image pixel in the image data.

18. The method of claim 14, further comprising configuring the processor to use the motion data to predict a change in image intensity of the image data.

19. The method of claim 14, further comprising configuring the processor to estimate local image velocities from the image data and utilize the local image velocities to produce an equivalent measurement of frame linear and angular velocities.

20. The method of claim 14, wherein the inertial sensing system comprises an accelerometer and a gyroscope.

* * * * *